United States Patent [19]

Evers et al.

[11] 4,142,037
[45] Feb. 27, 1979

[54] READILY CURABLE FLUOROCARBON ETHER BIBENZOXAZOLE POLYMERS

[75] Inventors: Robert C. Evers, Dayton; Tonson Abraham, Kettering, both of Ohio

[73] Assignee: The United States of America as represented by the Secretary of the Air Force, Washington, D.C.

[21] Appl. No.: 863,026

[22] Filed: Dec. 21, 1977

[51] Int. Cl.$^2$ .............................................. C08G 65/40
[52] U.S. Cl. ...................................... 528/210; 528/211
[58] Field of Search .......... 260/47 R, 61; 528/210; 211

[56] References Cited

U.S. PATENT DOCUMENTS

| | | | |
|---|---|---|---|
| 3,846,376 | 11/1974 | Evers | 260/61 |
| 4,053,498 | 10/1977 | Evers | 260/453 RW |
| 4,064,109 | 12/1977 | Evers | 260/61 |

*Primary Examiner*—Lester L. Lee
*Attorney, Agent, or Firm*—Joseph E. Rusz; Cedric H. Kuhn

[57] ABSTRACT

Thermooxidatively and hydrolytically stable perfluoroalkylene ether bibenzoxazole polymers containing hydrocarbon cure sites are synthesized by the polycondensation of a fluorocarbon bis(o-aminophenol) containing a hydrocarbon moiety and a perfluoroalkylene ether diimidate or dithioimidate ester. The polymers are readily curable to elastomers that are resistant to hydrolysis over a wide use-temperature range. Thus, the polymers are especially suitable for use in aerospace applications where extreme environments are encountered. In particular, the polymers are useful as seals, sealants, and the like.

7 Claims, No Drawings

READILY CURABLE FLUOROCARBON ETHER BIBENZOXAZOLE POLYMERS

RIGHTS OF THE GOVERNMENT

The invention described herein may be manufactured or used by or for the Government of the United States for all governmental purposes without the payment of any royalty.

BACKGROUND OF THE INVENTION

As disclosed in the patent literature, perfluoroalkylene ether bibenzoxazole polymers possessing a high degree of thermooxidative and hydrolytic stability as well as low glass transition temperatures can be readily synthesized. Examples of such polymers are disclosed by one of us in U.S. Pat. Nos. 3,846,376; 3,994,861; and 4,005,142. Because of the properties of the polymers, they have shown promise as candidate materials for advanced aerospace applications involving severe environments. A problem encountered with the prior art polymers involves the difficulty in curing them to a satisfactory elastomer. While the polymers can be cured to elastomers, the process is difficult and requires relatively extreme conditions. In addition, the mechanical properties of the resultant elastomers require upgrading in order to meet the rigid requirements of aerospace applications.

It is an object of this invention, therefore, to provide perfluoroalkylene ether bibenzoxazole polymers containing hydrocarbon cure sites so that the polymers can be readily cured to elastomers exhibiting good mechanical properties in severe environments.

Another object of the invention is to provide perfluoroalkylene ether bibenzoxazole polymers possessing a high degree of thermooxidative and hydrolytic stability as well as low glass transition temperatures.

A further object of the invention is to provide a method for synthesizing the bibenzoxazole polymers.

Other objects and advantages of the invention will become apparent to those skilled in the art upon consideration of the accompanying disclosure.

SUMMARY OF THE INVENTION

The present invention resides in a polymer composition having the following structural formula:

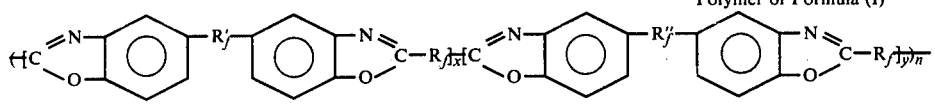

wherein $R_f'$ is $(CF_2)_3CH_2CH_2(CF_2)_3$
or $(CF_2)_3CH=CH(CF_2)_3$; $R_f''$ is
$(CF_2)_2O(CF_2)_5O(CF_2)_2$,
$(CF_2)_2OCF_2CFO(CF_2)_2OCFCF_2O(CF_2)_2$,
$\quad\quad\quad\quad |\quad\quad\quad\quad\quad |$
$\quad\quad\quad\quad CF_3\quad\quad\quad\quad CF_3$
$(CF_2)_2O(CF_2)_2O(CF_2)_5O(CF_2)_2$ or
$(CF_2)_2O(CF_2O(CF_2)_2$; $R_f$ is
$CF(OCF_2CF)_aO(CF_2)_5O(CFCF_2O)_bCF$,
$|\quad\quad |\quad\quad\quad\quad\quad\quad |\quad\quad |$
$CF_3\quad CF_3\quad\quad\quad\quad\quad CF_3\quad CF_3$
where (a+b) equals 4 or 5,
$CF(OCF_2CF_2)_cO(CF_2)_5O(CF_2CF_2O)_dCF$,
$|\quad\quad\quad\quad\quad\quad\quad\quad\quad\quad\quad\quad |$
$CF_3\quad\quad\quad\quad\quad\quad\quad\quad\quad\quad\quad\quad CF_3$
where (c+d) equals 5 or 6,
$CFO(CF_2CF_2O)_hCF$, $CF_2O(CF_2)_2OCF_2$,
$|\quad\quad\quad\quad\quad\quad |$
$CF_3\quad\quad\quad\quad\quad CF_3$ -continued
$(CF_2)_4O(CF_2)_2OCF_2$, $(CF_2)_4O(CF_2)_4O(CF_2)_4$
$Y(CFCF_2O)_e(CF_2)_4(OCF_2CF)_cY$, where Y is
$|\quad\quad\quad\quad\quad\quad\quad\quad\quad\quad\quad |$
$CF_3\quad\quad\quad\quad\quad\quad\quad\quad\quad CF_3$
$(CF_2)_4O-$ or $CFOCF_2CF_2O-$
$\quad\quad\quad\quad\quad\quad |$
$\quad\quad\quad\quad\quad\quad CF_3$ and e is an integer from 1 to 5, inclusive, or $CF_2(OCF_2CF_2)_fO(CF_2)_5O(CF_2CF_2O)_gCF_2$, where (f+g) equals 4 or 7; x equals 0.05 to 1, y equals zero to 0.95, and (x+y) equals 1; and n is equal to the number of recurring units. In general, n is an integer equal to at least 2, preferably an integer in the range of about 4 to 100. Alternatively, n can be defined as an integer having a value such that the polymer has an inherent viscosity of at least 0.10, e.g., 0.10 to 1.0, when measured at 25° C. as a 0.2 weight percent solution in hexafluoroisopropanol.

In one embodiment, the present invention resides in a process for preparing the above-described long chain perfluoroalkylene ether bibenzoxazole polymers wherein certain perfluoroalkylene ether bis(o-aminophenol) compounds are reacted in an inert atmosphere with certain perfluoroalkylene ether diimidate and dithioimidate esters. The reaction is carried out in a solvent in the presence of glacial acetic acid. Examples of gases that are useful in providing an inert atmosphere include nitrogen, argon and helium.

The monomers used and the condensation reaction involved in synthesizing the polymers of this invention are illustrated by the following equation:

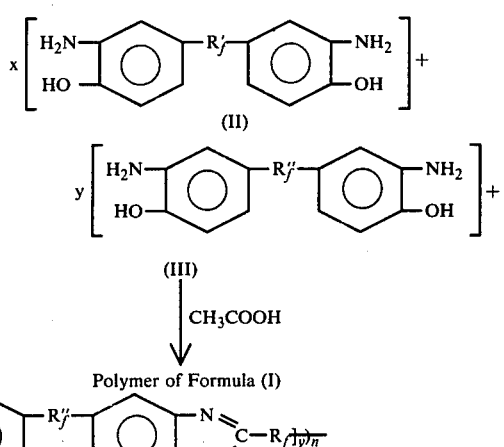

In the foregoing equation, $R_f'$, $R_f''$, $R_f$, Y, a, b, c, d, e, f, g, x and y are as defined hereinabove, and X is $OCH_2CF_3$ or $SC_2H_5$ when $R_f$ is $CF(OCF_2CF)_aO(CF_2)_5O(CFCF_2O)_b CF$, X is
$|\quad\quad |\quad\quad\quad\quad\quad\quad |\quad\quad |$
$CF_3\quad CF_3\quad\quad\quad\quad\quad CF_3\quad CF_3$ -continued

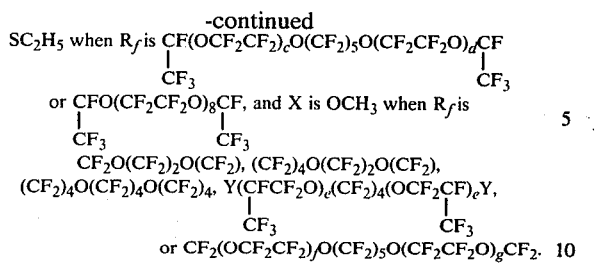

As seen from the equation, in the polymer product (I) the source of the $R_f'$ and $R_f''$ groups is the perfluoroalkylene ether bis(o-aminophenol) compounds (II and III) while the source of the $R_f$ group is the perfluoroalkylene ether diimidate and dithioimidate esters (IV). When x is equal to one and y, therefore, equals zero, the polymer product is a homopolymer containing $R_f'$ groups. On the other hand, when x is less than one and y has a value between zero and 0.95 with the sum of x and y equalling one, the polymer product is a copolymer containing both $R_f'$ and $R_f''$ groups. In any case the polymer product, whether a homopolymer or a copolymer, contains hydrocarbon cure sites in proportions required for effective crosslinking to occur.

As shown by the above equation, equimolar amounts of the bis(o-aminophenol) compounds and the diimidate and dithioimidate esters are utilized. The mole ratio of glacial acetic acid to ester is at least 2:1, e.g, 2 to 6:1. It is often preferred to use about four molar equivalents of acetic acid for each mole of ester. The acetic acid reacts with ammonia formed during the condensation reaction, converting it to ammonium acetate and thereby driving the reaction to completion.

The condensation reaction is conducted in the presence of a halogenated hydrocarbon which is a solvent for the monomers. In order to obtain high molecular weight polymers, it has been found to be necessary to employ hexafluoroisopropanol as the solvent. The temperature at which the reaction is conducted usually ranges from about 50° to 70° C. The reaction period depends upon the molecular weight it is desired the polymer product to have, being longer for higher molecular weight products. Generally, the reaction times range from about 5 to 15 days although shorter and longer periods can be used.

At the end of the reaction period, the polymer is recovered and purified by a general procedure that is conventionally followed in solution polymerization processes. For example, the reaction mixture is poured into a non-solvent for the polymer, e.g., into an alcohol such as methanol, thereby causing the polymer to precipitate from solution. The precipitated polymer is then separated from solution by any suitable means, such as by filtration or decantation. The separated polymer may thereafter be washed with an alcohol after which it is redissolved in a solvent, such as 1,1,2-trichlorotrifluoroethane, and again precipitated from solution by pouring the solution into methanol. After separation of the precipitated polymer, it may be washed again with methanol and then dried under a vacuum. It is pointed out that the foregoing procedure can be repeated one or more times in order to further purify the product.

The following fluorocarbon bis(o-aminophenol) compounds containing hydrocarbon moieties are necessary monomers in preparing the polymer products:

1. 1,2-bis[3-(4-hydroxy-3-aminophenyl)perfluoropropyl]ethane, and
2. 1,2-bis[3-(4-hydroxy-3-aminophenyl)perfluoropropyl]ethylene. The above-listed compounds can also be represented by formula (II) above in which $R_f'$ is $(CF_2)_3CH_2CH_2(CF_2)_3$ or $(CF_2)_3CH=CH(CF_2)_3$. The procedures followed in preparing the compounds are described hereinafter in Examples I and II. Further details regarding their synthesis are disclosed in our copending patent application Ser. No. 856,385, filed on Dec. 1, 1977, the disclosure of which is incorporated herein by reference.

Listed below are bis(o-aminophenol) compounds that are employed in conjunction with the compounds disclosed in the preceding paragraph in synthesizing the copolymers:

3. 1,11-bis(3-amino-4-hydroxyphenyl)perfluoro-3,9-dioxaundecane,
4. 1,14-bis(3-amino-4-hydroxyphenyl)perfluoro-5,10-dimethyl-3,6,9,12-tetraoxatetradecane,
5. 1,17-bis(3-amino-4-hydroxyphenyl)perfluoro-3,6,9,15-tetraoxaheptadecane, and
6. 1,8-bis(3-amino-4-hydroxyphenyl)perfluoro-3,6-dioxaoctane. The foregoing compounds can also be represented by formula (III) above in which

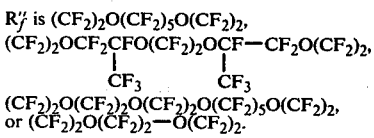

The preparation of compound (3) is described in U.S. Pat. No. 3,903,166 while the synthesis of compounds (4) and (5) is disclosed in U.S. Pat. No. 4,005,142. The synthesis of compound (6) is disclosed in commonly assigned copending application Ser. No. 817,658, filed by one of us on July 21, 1977. The disclosures of these two patents and patent application are incorporated herein by reference.

The diimidate and dithioimidate esters used in preparing the polymers of this invention correspond to formula IV in which $R_f$ is one of the following groups:

(a) $CF(OCF_2CF)_aO(CF_2)_5O(CFCF_2O)_bCF$,
  $\quad |\qquad\quad |\qquad\qquad\quad |\qquad\quad |$
  $\quad CF_3\quad\ CF_3\qquad\qquad\ CF_3\quad CF_3$
  where (a+b) equals 4 or 5;

(b) $CF(OCF_2CF_2)_cO(CF_2)_5O(CF_2CF_2O)_dCF$,
  $\quad |\qquad\qquad\qquad\qquad\qquad\qquad\qquad |$
  $\quad CF_3\qquad\qquad\qquad\qquad\qquad\qquad CF_3$
  where (c+d) equals 5 or 6;

(c) $CFO(CF_2CF_2O)_8CF$;
  $\ |\qquad\qquad\qquad |$
  $CF_3\qquad\qquad\ CF_3$ (d) $CF_2O(CF_2)_2O(CF_2)$;
(e) $(CF_2)_4O(CF_2)_2O(CF_2)$;
(f) $(CF_2)_4O(CF_2)_4O(CF_2)_4$;
(g) $Y(CFCF_2O)_e(CF_2)_4(OCF_2CF)_eY$, where Y is $(CF_2)_4O-$ or
  $\quad\quad |\qquad\qquad\qquad\qquad\ |$
  $\quad\ CF_3\qquad\qquad\qquad\ CF_3$ $CFOCF_2CF_2O-$
  $|$
  $CF_3$ and e is an integer from 1 to 5, inclusive; and h. $CF_2(OCF_2CF_2)_fO(CF_2)_5O(CF_2CF_2O)_gCF_2$, where (f+g) equals 4 or 7.

The preparation of imidate and thioimidate esters containing group (a) as listed in the preceding paragraph is described in U.S. Pat. No. 4,053,498. The preparation of thioimidate esters containing groups (b) and (c) is described in commonly assigned copending application Ser. No. 817,657, filed by one of us on July 21, 1977. Imidate esters containing groups (d) and (e) are disclosed in U.S. Pat. No. 3,903,166 while imidate esters containing groups (f), (g) and (h) are disclosed in U.S. Pat. No. 3,994,861. The disclosures of these patents and patent application are incorporated herein by reference.

A more comprehensive understanding of the invention can be obtained by referring to the following illustrative examples which are not intended, however, to be unduly limitative of the invention.

EXAMPLE I

A. Preparation of 4-(Perfluoro-3-iodopropyl)phenyl acetate

A solution of p-iodophenyl acetate (27.5 g, 105 mmol) and 1,3-diiodohexafluoropropane (52.0g, 128.7 mmol) in 100 ml of anhydrous dimethyl sulfoxide was heated to 120° C. under nitrogen. Copper powder (13.5 g, 211 g atoms) was added to the vigorously stirred solution in five approximately equal amounts at 20 minute intervals. After the addition of copper was complete, the reaction mixture was stirred at 120° C. for an additional 1.5 hours. On cooling, saturated aqueous ammonium chloride together with methylene chloride was added to the reaction vessel. The excess copper and cuprous salts were filtered off, the organic layer separated, and the aqueous layer was extracted with more methylene chloride. The organic extracts were combined, washed well with water, dried over anhydrous magnesium sulfate, and reduced in volume to a light yellow oil. The oil was refluxed in 25 ml of acetic anhydride for 45 minutes and the excess acetic anhydride and acetic acid were vacuum distilled. Distillation of the residual oil yielded 24.85 g of crude 4-(perfluoro-3-iodopropyl)phenyl acetate bp126°–127° C./3.4 mm Hg, mp 75°–81° C. Recrystallization of this material from hexane gave 20.8 g (48% yield) of purer material, mp 84.5°–88° C. Repeated crystallization from hexane raised the melting point to 88.5°–89.5° C., which could not be improved upon by further recrystallization.

Analysis Calc'd for $C_{11}H_7F_6IO_2$: C,31.37; H,1.71; I,30.79 Found: C,32.33; H,1.28; I,30.09

The product was identified by infrared and nuclear magnetic resonance spectroscopy as 4-(perfluoro-3-iodopropyl)phenyl acetate.

Molecular weight (mass spectroscopy): Calc'd - 412 Found - 412

B. Preparation of Trans-1,2-bis[3-(4-hydroxyphenyl)perfluoropropyl]ethylene

Copper powder (10.0 g) was added to a solution of 4-(perfluoro-3-iodopropyl)phenyl) acetate (15.0 g, 36.4 mmol) and trans-1,2-diiodoethylene (5.25 g, 18.7 mmol) in 90 ml of anhydrous dimethylacetamide. The reaction mixture was maintained under nitrogen at 130° C. for 12 hours with vigorous stirring. Saturated aqueous ammonium chloride and methylene chloride were then added to the cooled reaction mixture. The excess copper and cuprous salts were filtered off, the organic layer separated, and the aqueous layer extracted with more methylene chloride. The organic extracts were combined, washed with 15% hydrochloric acid followed by a thorough washing with water. Drying of the organic phase over anhydrous magnesium sulfate followed by evaporation of the extract yielded a crude light brown solid. This solid was taken up in 95 ml of methanol and refluxed for 1 hour after the addition of 5 ml of concentrated hydrochloric acid. Extraction of the cold methanol solution with methylene chloride followed by evaporation of the solvent after washing with water and drying over anhydrous magnesium sulfate yielded a solid which could be recrystallized from methylene chloride-hexane. Trans-1,2-bis[3-(4-hydroxyphenyl)perfluoropropyl]ethylene (6.02 g) was obtained in 65% yield as white crystals, mp 134°–137.5° C. Crystals with mp 137.5°–138° C. could not be further purified by recrystallization.

Analysis Calc'd for $C_{20}H_{12}F_{12}O_2$: C,46.88; H,2.36 Found: C,47.29; H,1.62

The product was identified by infrared and nuclear magnetic resonance spectroscopy as trans-1,2-bis[3-(4-hydroxyphenyl)perfluoropropyl]ethylene.

Molecular weight (mass spectroscopy): Calc'd - 512 Found - 512

C. Preparation of Trans-1,2-bis[3-(4-hydroxy-3-nitrophenyl)perfluoropropyl]ethylene Trans-1,2-bis[3-(4-hydroxyphenyl)perfluoropropyl]ethylene (5.66 g) was warmed in 20 ml of acetic acid until a clear solution formed. After the addition of concentrated nitric acid (4.0 ml), the reaction solution was stirred at 45°–55° C. until an exotherm occurred after 5-10 minutes of heating. During the exotherm the temperature was maintained at 60° C. (ice bath). The red color that developed during this period gradually faded to a light yellow color on continued stirring at 55°–60° C. for 4.5 hours. The precipitate that appeared, however, increased as stirring continued. The acetic acid was then chilled (ice bath), the light yellow precipitate filtered off, washed with pentane and dried to give 5.06 g (75% yield) of trans-1,2-bis-[3-(4-hydroxy-3-nitrophenyl)perfluoropropyl]ethylene, mp 122°–123° C. This melting point could not be improved by recrystallization from methylene chloride-hexane solutions.

Analysis Cal'd for $C_{20}H_{10}F_{12}N_2O_6$: C,39.88; H,1.67; N,4.65 Found: C,40.29; H,0.92; N,5.05

The product was identified by infrared and nuclear magnetic resonance spectroscopy as trans-1,2-bis[3-(4-hydroxy-3- nitrophenyl)perfluoropropyl]ethylene.

Molecular weight (mass spectroscopy): Calc'd -602; Found - 602

D. Preparation of 1,2-bis[3-(4-hydroxy-3-aminophenyl)perfluoropropyl]ethane

A solution of trans-1,2-bis[3-(4-hydroxy-3-nitrophenyl)perfluoropropyl]ethylene (5.0 g) in 60 ml of ethyl acetate containing 10% palladium on charcoal (1.0 g) was deoxygenated with nitrogen and subjected to 50 psi of hydrogen, with agitation, for 5 hours at room temperature. After filtering off the catalyst, the ethyl acetate solution was reduced in volume and crystallization induced by adding hexane to the hot ethyl acetate solution. 1,2-bis[3-(4-hydroxy-3-aminophenyl)perfluoropropyl]ethane was obtained as white crystals in two fractions: 1.97 g, d 202°–202.5° C. (sealed cap) and 0.98 g, d 202° C. (sealed cap). Total yield: 59%. The higher melting material could not be further purified by recrystallization.

Analysis Calc'd for $C_{20}H_{16}F_{12}N_2O_2$: C,44.29; H,2.60; N,5.16 Found: C,44.28; H,2.61; H,4.75

The product was identified by infrared and nuclear magnetic resonance spectroscopy as 1,2-bis[3-(4-hydroxy-3-aminophenyl)perfluoropropyl]ethane.

Molecular weight (mass spectroscopy): Calc'd - 544 Found - 544

EXAMPLE II

Preparation of 1,2-Bis[3-(4-Hydroxy-3-aminophenyl)perfluoropropyl]ethylene

Sodium dithionite (10 g) in 30 ml of water was added slowly with stirring at room temperature to a solution of 1.0 g (0.0017 mole) of trans-1,2-bis[3-(4-hydroxy-3-nitrophenyl)perfluoropropyl]ethylene (prepared as described in Example I) in 250 ml of methanol. The methanolic solution turned bright yellow and then slowly faded to water-white as reduction occurred. After addition of the sodium dithionite was completed, stirring was continued for an additional 30 minutes at which time water was added, resulting in a total solution volume of 750 ml. The resultant white slurry was extracted three times with 200 ml portions of ether and the combined ether extracts were washed repeatedly with water. The ether solution was then dried over anhydrous magnesium sulfate and stripped to dryness under reduced pressure to give a white residue. Most of this solid was soluble in 900 ml of hot toluene which was treated with charcoal and reduced in volume to 100 ml. Cooling in dry ice gave 0.5 g (55% yield) of the olefinic product as white platelets, mp 187°–188° C.

Analysis Calc'd for $C_{20}H_{14}F_{12}N_2O_2$: C,44.29; H, 2.60; N,5.16 Found : C,44.85; H,2.79; N,4.99

Molecular weight (mass spectroscopy): Calc'd - 542 Found - 542

EXAMPLE III

A run was carried out in which a perfluoroalkylene ether bibenzoxazole polymer was synthesized by the polycondensation of the fluorocarbon ether bis(o-aminophenol) as prepared in Example I with a fluorocarbon ether thioimidate ester. The reaction involved is shown by the following equation:

In conducting the run, 5 ml of redistilled hexafluoroisopropanol was added to a mixture of the fluorocarbon bis(o-aminophenol) (1) (0.229 g, 0.00042 mole) and the thioimidate ester (2) (0.521 g, 0.00042 mole). Glacial acetic acid (0.10 g, 0.0016 mole) was added and the resultant suspension stirred under nitrogen at 55°–60° C. After several days a clear amber reaction mixture resulted. After a total reaction time of 10 days, the polymer was precipitated from methanol and redissolved in Freon 113. Drying for 2 hours at 100° C. (0.05 mm Hg) yielded 0.51 g (75% yield) of rubbery polymer ($\eta$ inh = 0.62 dl/g in hexafluoroisopropanol at 25° C.).

Analysis Calc'd: C,30.31; H,0.62; N,1.72 Found: C,30.81; H,0.31; N,1.90

Thermogravimetric analysis in air indicated an onset of breakdown at 380° C. with a 25 percent weight loss at 500° C. Differential scanning calorimetry revealed a glass transition temperature of −14° C. No change in polymer infrared spectrum was observed after exposure to 95 percent relative humidity at 200° F. for several weeks. Admixture of a portion of the polymer with a 1/1 benzoyl peroxide-magnesium oxide formulation (about 5% by weight) followed by heating at 250° F. for an hour yielded a tough, insoluble, very densely cross-linked vulcanizate.

EXAMPLE IV

A run was conducted in which a perfluoroalkylene ether bibenzoxazole polymer was prepared by the polycondensation of a hydrocarbon-containing fluorocarbon ether bis(o-aminophenol), as prepared in Example I, and a fluorocarbon ether bis(o-aminophenol), with a

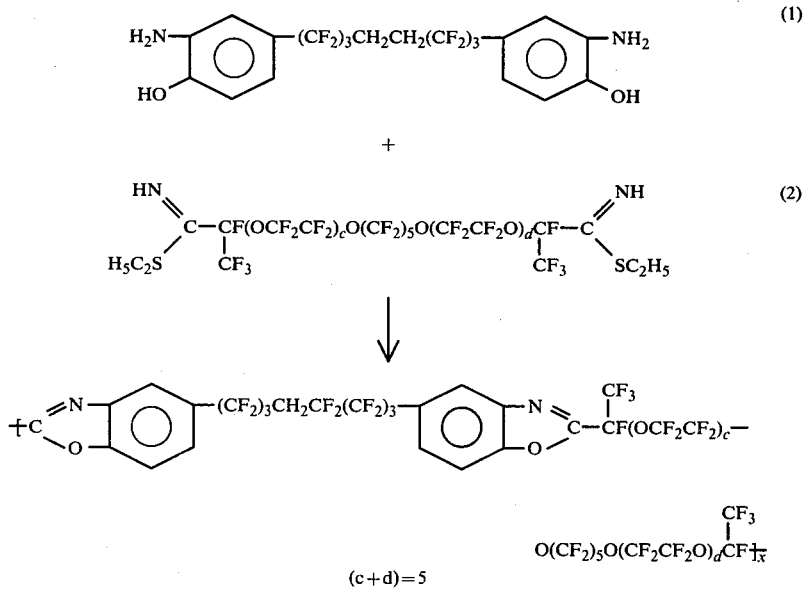

fluorocarbon ether thioimidate ether. The reaction involved is shown by the following equation:

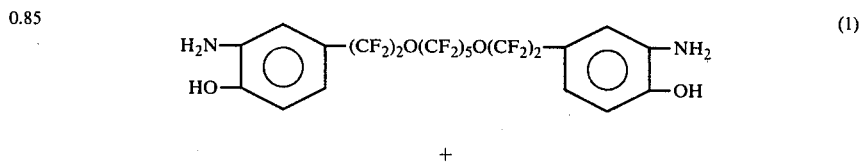

+

0.15 (2)

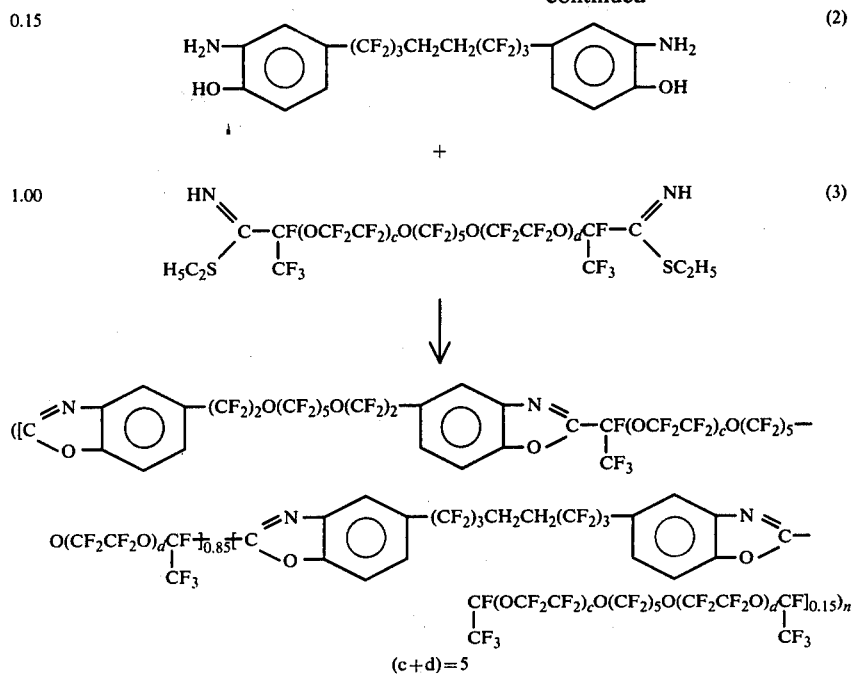

(c+d)=5

In conducting the run, redistilled hexafluoroisopropanol (20 ml) was added to a mixture of bis(o-aminophenol) (1) (1.023 g, 0.0015 mole), bis(o-aminophenol) (2) (0.141 g, 0.0002 mole) and thioimidate ester (3) (2.134 g, 0.0017 mole). Glacial acetic acid (0.40 g, 0.0064 mole) was added to the resulting slurry, and the reaction mixture was heated under nitrogen with stirring at 55° to 60° C. After about 4 days, a clear amber solution was formed. The polycondensation reaction was allowed to proceed for a total reaction time of ten days at which time the reaction mixture was poured into 200 ml of methanol. The supernatant liquid was decanted and the precipitated polymer was redissolved in 10 ml of Freon 113. Filtration of this solution followed by reprecipitation in methanol yielded a swollen tacky polymer which was washed several times with methanol. Drying for two hours at 188° C./0.01 mm Hg gave 1.95 g (65% yield) of rubbery polymer ($\eta$ inh = 0.45 dl/g in hexafluoroisopropanol at 25° C.).

Analysis Calc'd: C,28.63; H,0.37; N,1.59 Found: C,28.64; H,0.04; N,1.73

Thermooxidative stability of the copolymer by thermogravimetric analysis was similar to that of the homopolymer of Example III. Differential scanning calorimetry revealed a glass transition temperature of −24° C. Hydrolytic stability of the copolymer was equivalent to that of the homopolymer of Example III.

Milling of various formulations of the copolymer and magnesium oxide/benzoyl peroxide both with and without a silica reinforcing filler was carried out followed by a pressure cure for one hour at 260° F. The formulations used and mechanical properties of the resultant vulcanizates are summarized below in Table I.

TABLE I

| Formulation, parts by weight | | Tensile Strength psi | Elongation, % | Shore A Hardness, pts |
|---|---|---|---|---|
| 1. Copolymer | 100 | 657 | 1282 | — |
| MgO | 10 | | | |
| Benzoyl peroxide | 2 | | | |
| 2. Copolymer | 100 | 820 | 510 | 69 |
| MgO | 10 | | | |
| Benzoyl peroxide | 5 | | | |
| 3. Copolymer | 100 | 1185 | 645 | 65 |
| MgO | 10 | | | |
| Benzoyl peroxide | 5 | | | |
| Silica | 20 | | | |

Exposure of the vulcanizates to 95 percent humidity at 200° F. for four weeks did not affect their physical properties. By comparison, an analogously structured perfluoroalkylene ether bibenzoxazole polymer, which did not contain hydrocarbon cure sites, could not be cured at 260° F. It did not undergo cure until 340° F. to give a vulcanizate with lower tensile strength and elongation of 450 psi and 600%, respectively.

EXAMPLE V

A run was conducted in which a perfluoroalkylene ether bibenzoxazole polymer was prepared by the polycondensation of a hydrocarbon-containing fluorocarbon ether bis(o-aminophenol), as prepared in Example I, and a fluorocarbon ether bis(o-aminophenol), with a fluorocarbon ether thioimidate ester. The reaction involved is shown by the following equation:

0.90 (1)

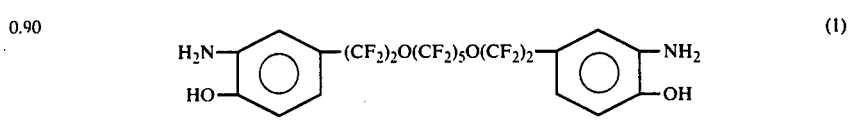

+

0.10

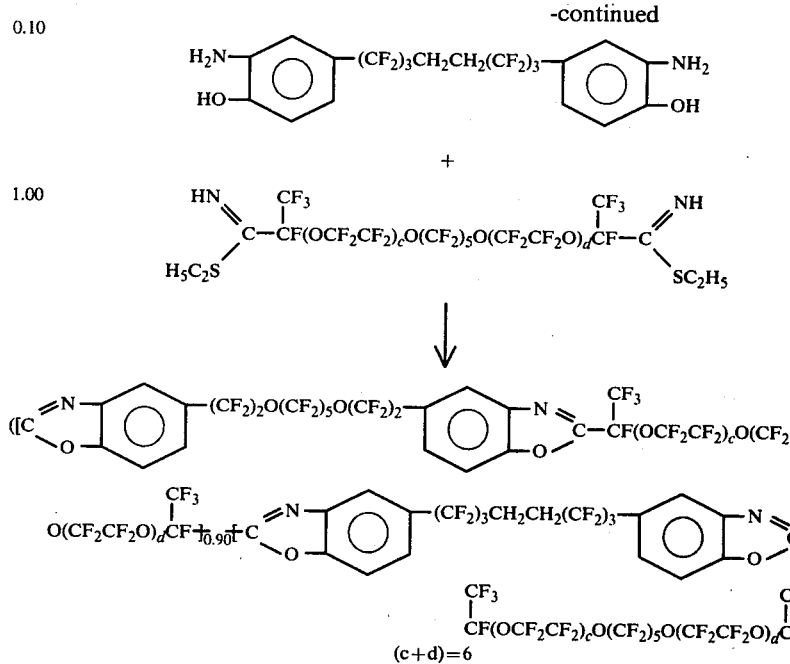

In conducting the run, 6 ml of redistilled hexafluoroisopropanol was added to a mixture of bis(o-aminophenol) (1) (1.678 g, 0.0024 mole), bis(o-aminophenol) (2) (0.145 g, 0.0003 mole), and thioimidate ester (3) (3.617 g, 0.0027 mole). Glacial acetic acid (0.64 g, 0.0011 mole) was added and the resultant suspension was stirred under nitrogen at 55°–60° C. After approximately four days, a clear, amber solution was formed. The polycondensation reaction was allowed to proceed for a total reaction time of 25 days at which time it was precipitated from 250 ml of methanol. The supernatant was decanted and the precipitated polymer was redissolved in 10 ml of Freon 113. Filtration of this solution followed by reprecipitation in methanol yielded a swollen, tacky polymer. Drying for three hours at 188° C./0.01 mm Hg gave 4.60 g (70% yield) of rubbery polymer ($\eta$ inh = 0.48 dl/g in hexafluoroisopropanol at 25° C.).

Analysis Calc'd: C,28.06; H,0.34; N,1.49 Found: C,27.89; H,0.11; N,1.39

Thermooxidative stability of the copolymer by thermogravimetric analysis was similar to that of the homopolymer of Example III. Differential scanning calorimetry revealed a glass transition temperature of $-35°$ C. Hydrolytic stability of the copolymer was equivalent to that of the homopolymer of Example III. Milling of a formulation of 100 parts of copolymer, 10 parts of magnesium oxide, 10 parts of benzoyl peroxide, and 30 parts of carbon black reinforcing filler followed by a pressure cure for one hour at 260° F. gave a tough, hydrolytically stable elastomer with an ultimate tensile strength of 906 psi and an elongation of 360%. A Shore A hardness of 75 points was recorded. By comparison, an analogously structured perfluoroalkylene ether bibenzoxazole polymer, which did not contain hydrocarbon cure sites, would not undergo cure under these conditions.

EXAMPLE VI

A run was conducted in which a perfluoroalkylene ether bibenzoxazole polymer was prepared by the polycondensation of a hydrocarbon-containing fluorocarbon ether bis(o-aminophenol), as prepared in Example II, and a fluorocarbon ether bis(o-aminophenol), with a fluorocarbon ether thioimidate ester. The reaction involved is shown by the following equation:

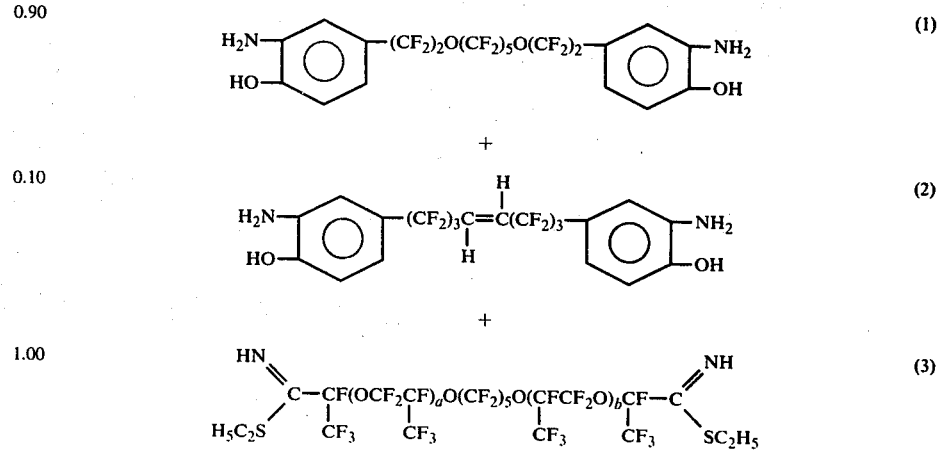

-continued

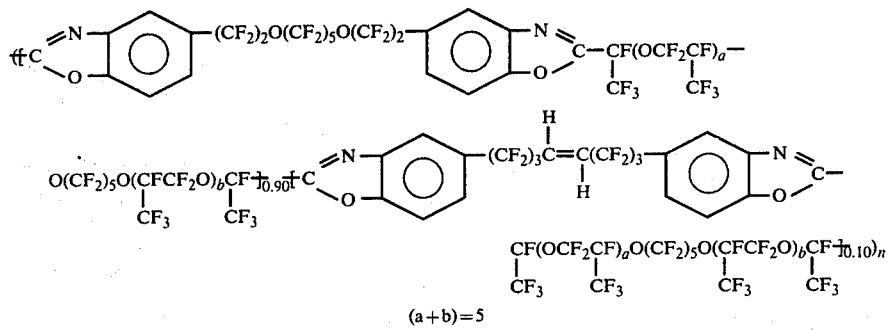

In conducting the run, 5.0 ml of redistilled hexafluoroisopropanol was added to a mixture of bis(o-aminophenol) (1) (1.574 g, 0.0023 mole), bis(o-aminophenol) (2) (0.136 g, 0.0002 mole) and thioimidate ester (3) (3.727 g, 0.0025 mole). Glacial acetic acid (0.65 g, 0.0108 mole) was added to the resulting slurry, and the reaction mixture was heated under nitrogen with stirring at 55° to 60° C. After about seven days, a clear amber solution was formed.

The polycondensation was allowed to proceed for a total reaction time of twenty days at which time the viscous reaction mixture was poured into 300 ml of methanol. The supernatant liquid was decanted and the precipitated polymer was redissolved in 10 ml of Freon 113. Filtration of the solution followed by reprecipitation in methanol yielded a swollen, tacky polymer. Drying for four hours at 140° C./0.01 mm Hg gave 3.12 g (62% yield) of rubbery polymer ($\eta$ inh = 0.20 dl/g in hexafluoroisopropanol at 25° C.).

Analysis Calc'd: C,27.98; H,0.31; N,1.39 Found: C,27.69; H,0.20; N,1.49

Thermooxidative stability of the copolymer by thermogravimetric analysis was similar to that of the homopolymer of Example III. Differential scanning calorimetry revealed a glass transition temperature of $-19°$ C. Hydrolytic stability of the copolymer was equivalent to that of the homopolymer of Example III. Milling of a formulation of 100 parts of copolymer, 5 parts of magnesium oxide, 10 parts of benzoyl peroxide, and 20 parts of silica reinforcing filler followed by a pressure cure for one hour at 260° F. gave a tough, hydrolytically stable elastomer with an ultimate tensile strength of 520 psi and an elongation of 840%. A Shore A hardness value of 52 points was recorded. Postcuring of the elastomer for 20 hours at 400° F. gave a vulcanizate with an ultimate tensile strength of 665 psi, an elongation of 510%, and a Shore A hardness value of 72 points. Treatment of analogously structured perfluoroalkylene ether bibenzoxazole polymer, which did not contain hydrocarbon cure sites, under the formulation and cure conditions described above did not produce a vulcanizate.

EXAMPLE VII

A series of runs identified in the tables below as runs no. 1-4 was conducted in which long chain, readily curable fluorocarbon ether bibenzoxazole polymers were prepared in accordance with the procedure described in Examples III-VI. The polymer products consisted essentially of repeating units defined by formula I above. The $R_f'R_f''$ and $R_f$ groups derived from bis(o-aminophenols) (formulas II and III) and thioimidate esters (formula IV) used in the condensation reactions depicted in the above equation are shown below in Table II. Also set forth in the table are the values for x and y, as shown in the above equation, when a copolymer was prepared. In all runs, the mole ratio of bis(o-aminophenols) to thioimidate esters was 1:1.

TABLE II

| Run No. | $R_f'$ | $R_f''$ | $R_f$ |
|---|---|---|---|
| 1 | $(CF_2)_3CH_2CH_2(CF_2)_3$ | | $CF(OCF_2CF)_aO(CF_2)_5O(CFCF_2O)_bCF$<br>$\|\quad\quad\quad\quad\quad\quad\quad\quad\quad\quad\quad\quad\quad\|$<br>$CF_3\quad CF_3\quad\quad\quad\quad\quad CF_3\quad CF_3$<br>(a+b)=5 |
| 2 | " | | $CF(OCF_2CF_2)_cO(CF_2)_5O(CF_2CF_2O)_dCF$<br>$\|\quad\quad\quad\quad\quad\quad\quad\quad\quad\quad\quad\quad\quad\|$<br>$CF_3\quad\quad\quad\quad\quad\quad\quad\quad\quad\quad\quad\quad CF_3$<br>(c+d)=6 |
| 3 | $0.10(CF_2)_3CH_2CH_2(CF_2)_3$ | $0.90(CF_2)_2O(CF_2)_5O(CF_2)_2$ | " |
| 4 | " | " | $CF(OCF_2CF)_aO(CF_2)_5O(CFCF_2O)_bCF$<br>$\|\quad\quad\quad\quad\quad\quad\quad\quad\quad\quad\quad\quad\quad\|$<br>$CF_3\quad CF_3\quad\quad\quad\quad\quad CF_3\quad CF_3$<br>(a+b)=5 |

The reaction periods, reactant concentration in hexafluoroisopropanol solvent and the results obtained are shown in Table III.

TABLE III

| Run No. | Time, Hours | Reactant Concentration % Monomers ($\frac{W}{V}$) | $\eta$ inh[1] dl/g | Tg° C[2] | Analysis $\frac{\text{Calc'd}}{\text{Found}}$ C | H | N |
|---|---|---|---|---|---|---|---|
| 1 | 240 | 13 | 0.22 | −4 | $\frac{29.47}{(29.39)}$ | $\frac{0.53}{(0.28)}$ | $\frac{1.49}{(1.61)}$ |
| 2 | 240 | 11 | 0.36 | −26 | $\frac{29.67}{(29.59)}$ | $\frac{0.58}{(0.02)}$ | $\frac{1.60}{(1.72)}$ |
| 3 | 576 | 90 | 0.46 | −35 | $\frac{28.06}{(28.10)}$ | $\frac{0.34}{(0.08)}$ | $\frac{1.49}{(1.57)}$ |
| 4 | 480 | 72 | 0.26 | −17 | $\frac{27.98}{(27.91)}$ | $\frac{0.32}{(0.11)}$ | $\frac{1.39}{(1.86)}$ |

[1] 0.2 g/dl, 25° C, HFIP
[2] Determined by differential scanning calorimetry, $\Delta T = 20°$ C/min.

From the foregoing, it is seen that the perfluoroalkylene ether bibenzoxazole polymers of this invention are thermooxidatively and hydrolytically stable and possess a low glass transition. Of primary significance, the polymers make it possible to solve a difficult problem encountered with prior bibenzoxazole polymers. Thus, the present polymer, as a result of containing aliphatic hydrocarbon groups which are reactive to free radical catalysis, can be readily cured under much milder conditions than previously necessary to employ. Furthermore, the resulting vulcanizates have good mechanical properties which can be increased by addition of a reinforcing filler, such as silica or carbon black, to the formulated gum stock before curing. As a result of the ease of curing the polymers to elastomers with favorable mechanical properties the polymers are eminently suitable for use in various aerospace applications, such as O-ring seals, diaphragms, and the like.

As will be evident to those skilled in the art, modifications of the present invention can be made in view of the foregoing disclosure without departing from the spirit and scope of the invention.

We claim:

1. A perfluoroalkylene ether bibenzoxazole polymer consisting essentially of recurring units having the following structural formula:

$$\left[ \begin{array}{c} \text{structural formula} \end{array} \right]$$

wherein $R_f'$ is $(CF_2)_3CH_2CH_2(CF_2)_3$ or $(CF_2)_3CH=CH(CF_2)_3$; $R_f''$ is $(CF_2)_2O(CF_2)_5O(CF_2)_2$, $(CF_2)_2OCF_2CFO(CF_2)_2OCFCF_2O(CF_2)_2$,
           |                |
          $CF_3$           $CF_3$ $(CF_2)_2O(CF_2)_2$—$O(CF_2)_2O(CF_2)_5O(CF_2)_2$, or $(CF_2)_2O(CF_2)_2O(CF_2)_2$; $R_f$ is $CF(OCF_2CF)_a$—$O(CF_2)_5O(CFCF_2O)_bCF$, where $(a + b)$ equals
 |          |                    |           |
$CF_3$    $CF_3$               $CF_3$      $CF_3$ 4 or 5, $CF(OCF_2CF_2)_cO(CF_2)_5$—$O(CF_2CF_2O)_dCF$, where
         |                                        |
        $CF_3$                                   $CF_3$ $(c + d)$ equals 5 or 6, $CFO(CF_2CF_2O)_8CF$, $CF_2O(CF_2)_2$—$OCF_2$,
                          |         |
                         $CF_3$    $CF_3$ $(CF_2)_4O(CF_2)_2OCF_2$, $(CF_2)_4O(CF_2)_4O(CF_2)_4$, -continued $Y(CFCF_2O)_e(CF_2)_4$—$(OCF_2CF)_eY$, where Y is
  |                        |
 $CF_3$                   $CF_3$ $(CF_2)_4O$— or $CFOCF_2CF_2O$—
                |
               $CF_3$ and e is an integer from 1 to 5, inclusive, or $CF_2(OCF_2CF_2)_fO(CF_2)_5O(CF_2CF_2O)_gCF_2$, where $(f+g)$ equals 4 or 7; x equals 0.05 to 1, y equals zero to 0.95, and $(x+y)$ equals 1; and n is equal to the number of recurring units.

2. The bibenzoxazole polymer of claim 1 in which $R_f'$ is $(CF_2)_3CH_2CH_2(CF_2)_3$;

$R_f$ is $CF(OCF_2CF)_aO(CF_2)_5O(CFCF_2O)_bCF$,
         |           |           |           |
        $CF_3$      $CF_3$      $CF_3$      $CF_3$ where $(a+b)$ equals 5; and x equals 1 and y equals zero.

3. The bibenzoxazole polymer of claim 1 in which $R_f'$ is $(CF_2)_3CH_2CH_2(CF_2)_3$;

$R_f$ is $CF(OCF_2CF_2)_cO(CF_2)_5O(CF_2CF_2O)_dCF$,
         |                                      |
        $CF_3$                                 $CF_3$ where $(c+d)$ equals 6; and x equals 1 and y equals zero.

4. The bibenzoxazole polymer of claim 1 in which $R_f'$ is $(CF_2)_3CH_2CH_2(CF_2)_3$; $R_f''$ is $(CF_2)_2O(CF_2)_5O(CF_2)_2$;

$R_f$ is $CF(OCF_2CF_2)_cO(CF_2)_5O(CF_2CF_2O)_dCF$,
         |                                      |
        $CF_3$                                 $CF_3$ where $(c+d)$ equals 6; and x equals 0.10 and y equals 0.90.

5. The bibenzoxazole polymer of claim 1 in which $R_f'$ is $(CF_2)_3CH_2CH_2(CF_2)_3$; $R_f''$ is $(CF_2)_2O(CF_2)_5O(CF_2)_2$;

$R_f$ is $CF(OCF_2CF)_aO(CF_2)_5O(CFCF_2O)_bCF$,
         |           |           |           |
        $CF_3$      $CF_3$      $CF_3$      $CF_3$ where $(a+b)$ equals 5; and x equals 0.10 and y equals 0.90.

6. The bibenzoxazole polymer of claim 1 in which $R_f'$ is $(CF_2)_3CH=CH(CF_2)_3$; $R_f''$ is $(CF_2)_2O(CF_2)_5O(CF_2)_2$;

$R_f$ is $\underset{CF_3}{CF(OCF_2CF)_a}O(CF_2)_5O\underset{CF_3}{(CFCF_2O)_b}CF_3$ where (a+b) equals 5; and x equals 0.10 and y equals 0.90.

7. The bibenzoxazole polymer of claim 1 in which $R_f'$ is $(CF_2)_3CH_2CH_2(CF_2)_3$; $R_f''$ is $(CF_2)_2O(CF_2)_5O(CF_2)_2$;

$R_f$ is $\underset{CF_3}{CF(OCF_2CF_2)_c}O(CF_2)_5O(CF_2CF_2O)_d\underset{CF_3}{CF_3}$ where (c+d) equals 5; and x equals 0.15 and y equals 0.85.

* * * * *

UNITED STATES PATENT AND TRADEMARK OFFICE
CERTIFICATE OF CORRECTION

PATENT NO. : 4,142,037
DATED : February 27, 1979
INVENTOR(S) : Robert C. Evers and Tonson Abraham It is certified that error appears in the above–identified patent and that said Letters Patent are hereby corrected as shown below:

Column 1, lines 59 and 60, the last two $R_f''$ groups should read -- $(CF_2)_2O(CF_2)_2O(CF_2)_2O(CF_2)_5O(CF_2)_2$ or $(CF_2^f)_2O(CF_2)_2O(CF_2)_2$ --.
Column 2, line 1, at end of line, change the "4" to a -- , --.
Column 8, line 58, "ether", second occurrence, should read -- ester --.

Signed and Sealed this

Tenth Day of July 1979

[SEAL]

Attest:

Attesting Officer

LUTRELLE F. PARKER
Acting Commissioner of Patents and Trademarks